United States Patent
Gerhard

(10) Patent No.: US 6,952,683 B1
(45) Date of Patent: Oct. 4, 2005

(54) SYSTEM AND METHOD FOR HEDGING AGAINST FOREIGN EXCHANGE RISK ASSOCIATED WITH SECURITIES TRANSACTIONS

(75) Inventor: Meier Gerhard, Steinhausen (CH)

(73) Assignee: UBS AG (CH)

( * ) Notice: Subject to any disclaimer, the term of this patent is extended or adjusted under 35 U.S.C. 154(b) by 524 days.

(21) Appl. No.: 09/689,242

(22) Filed: Oct. 11, 2000

(51) Int. Cl.⁷ .............................................. G06F 17/60
(52) U.S. Cl. ............................. 705/37; 705/36; 705/44
(58) Field of Search ............................. 705/37, 36, 46, 705/4

(56) References Cited

U.S. PATENT DOCUMENTS

| | | | |
|---|---|---|---|
| 5,671,364 A | | 9/1997 | Turk ........................... 395/239 |
| 5,884,274 A | * | 3/1999 | Walker et al. .................. 705/4 |
| 5,897,621 A | | 4/1999 | Boesch et al. ................ 705/26 |
| 5,903,882 A | * | 5/1999 | Asay et al. .................... 705/44 |
| 5,963,923 A | * | 10/1999 | Garber ......................... 705/37 |
| 6,016,483 A | * | 1/2000 | Rickard et al. ............... 705/37 |
| 6,049,782 A | | 4/2000 | Gottesman et al. ........... 705/35 |
| 6,092,056 A | * | 7/2000 | Tull et al. ..................... 705/35 |
| 6,247,000 B1 | * | 6/2001 | Hawkins et al. ............. 705/37 |
| 6,278,981 B1 | * | 8/2001 | Dembo et al. ................ 705/36 |
| 6,321,212 B1 | * | 11/2001 | Lange .......................... 705/37 |
| 6,347,307 B1 | * | 2/2002 | Sandhu et al. ................ 705/35 |
| 2002/0147670 A1 | * | 10/2002 | Lange .......................... 705/35 |

FOREIGN PATENT DOCUMENTS

| | | |
|---|---|---|
| EP | 1 100 472 A2 | 6/2000 |
| WO | WO 00/30053 | * 5/2000 |

OTHER PUBLICATIONS

Nusbam, David "Trading the wide world of foreign exchange", Futures (Cedar Falls, Iowa), v24, n4, p624(4), Apr. 1995, Dialog file 148, Accession No. 07802037.*

<<Hedging Currency Risks—Dynamic Hedging Strategies Based on O & A Trading Models>> by Ulrich A. Müller, Jun. 28, 1995, 11 pages.

* cited by examiner

*Primary Examiner*—Frantzy Poinvil
(74) *Attorney, Agent, or Firm*—Proskauer Rose LLP

(57) ABSTRACT

A method for hedging an investor against a currency risk associated with a purchase of a security having a value, the investor having purchased the security in a foreign currency and the investor desiring to receive the proceeds from a sale of the security in a home currency. The foreign currency and home currency have an exchange rate at the time of the purchase and an exchange rate at the time of the sale. The method includes the steps of receiving a request for hedging against the currency risk for a time period. Next, a cost is calculated for hedging against the currency risk based on the foreign currency, the home currency, the exchange rate at the time of the purchase, the value and the time period. Next, the investor is provided with the proceeds from the sale based on the exchange rate at the time of the sale if the exchange rate at the time of the sale is greater than the exchange rate at the time of the purchase. Finally, the investor is provided with the proceeds from the sale based on the exchange rate at the time of the purchase if the exchange rate at the time of the purchase is greater than or equal to the exchange rate at the time of the sale.

13 Claims, 3 Drawing Sheets

SYSTEM AND METHOD FOR HEDGING AGAINST FOREIGN EXCHANGE RISK ASSOCIATED WITH SECURITIES TRANSACTIONS

BACKGROUND

The following invention relates to a method and system for hedging against the risk of fluctuations in foreign exchange rates and, in particular, for providing a hedge against foreign exchange risk associated with security transactions.

There has been a rapid increase in the number of securities of foreign companies that are traded in the U.S. financial markets, such as the New York Stock Exchange, the American Stock Exchange, NASDAQ and the over-the- counter markets. In addition, there has been an increasing interest on the part of U.S. investors regarding securities traded on foreign markets. These trends demonstrate a shift to a global cross-border trading network in which investors can trade in foreign securities as easily as trading in domestic securities.

A potential impediment to the establishment of a global trading network is that investors that trade in instruments in currencies other than their home currency will be exposed to the risks associated with the change in foreign exchange rates. For example, if a Japanese investors purchases 100 shares of XYZ corp. trading on the NASDAQ for $10 a share, the transaction would cost the investor 100,000 yen, assuming the exchange rate was 100 yen to the dollar at the time of the transaction. If the investor decides to sell the XYZ shares at a time when the exchange rate is 95 yen to the dollar, the investor would incur a 5% loss associated with the fluctuation in the foreign exchange rate. This added risk may deter an investor from trading in a foreign security.

There are existing techniques for protecting against the fluctuation of foreign exchange risks. For example, a buyer of an FX call option has right to purchase a specified amount of foreign currency at a specified exchange rate at a specified time. By purchasing an FX option for the currency the investor wishes to receive upon selling the foreign security, the investor can minimize the risk associated with the fluctuation of that currency.

FX options, however, are unsuitable for providing insurance against foreign exchange risks associated with a security transaction for several reasons. First, the use of FX options would add a layer of complexity to the security transaction by requiring the investor to be familiar with option investing and the use of calls and puts to hedge a position. Also, FX options are typically for fixed amounts of currency, for e.g. $100,000, and do not generally match the amount of currency risk associated with a typical securities transaction (in which the average order size in securities transaction is $15,000). Furthermore, the strike prices of FX options for a particular currency pair are predefined by the foreign exchange market makers and will often not match the exact exchange rate at which a specific securities transaction took place. In addition, FX option are normally "European style" in which case the premium does not strictly follow the exchange rate movements so that only partial FX risk protection is achieved. Also, European style options can only be exercised at expiry so they are not useful for protecting a specific equity position that may be terminated by the investor at any time. Finally, FX options are not easily purchased on-line so that equity investors will have to undergo a potentially time consuming process to hedge the FX risk associated with their foreign equity investment.

Another technique of hedging FX risks is the purchase of currency certificates. Currency certificates, however, also suffer from some of the same drawbacks as FX options including the introduction of added complexity to the securities transaction, standard certificate amounts that do not match the size of the hedge needed and predefined strike levels that do not match the exchange rate of the particular securities transaction.

A method for generating and executing an insurance policy for foreign exchange losses is disclosed in U.S. Pat. No. 5,884,274 (the "'274 patent"). The '274 patent teaches a method by which individual travelers can lock in favorable exchange rates for a particular foreign currency thereby eliminating the need to either purchase the foreign currency or an instrument denominated in the foreign currency, such as traveler's checks. Under the method of the '274 patent, an insurance policy is provided to the traveler based on the traveler's preferences including a specified currency, the amount of coverage and the period of coverage. The method then calculates the premium cost of the insurance policy based on the current exchange pair as well as an estimate of the volatility of the currency. Once the traveler purchases the foreign exchange policy for a particular exchange rate, that exchange rate is locked in for the amount of time and coverage specified in the policy. Thus, when the traveler makes a purchase in the foreign currency using a credit card, the exchange rate at the time of the purchase is compared to the exchange rate of the insurance policy to determine if the traveler is entitled to foreign exchange adjustment. Similarly, insurance coverage may be provided when the traveler withdraws the foreign currency from an ATM or from a bank.

Although the '274 patent discloses providing individuals an insurance policy against foreign exchange loss for a desired currency amount and for a desired period of time, the '274 patent does not teach a method for providing a hedge to investors against foreign exchange risks associated with the purchase of financial instruments, such as equity securities, in currencies other than their home currency. Furthermore, the method disclosed in '274 patent is not suitable for providing a hedge against foreign exchange losses associated with trading foreign equity securities. First, in the '274 patent, once the purchased coverage amount specified by the insurance policy is exceeded, the traveler is no longer protected against currency fluctuations. With respect to a purchase of an equity instrument, however, such a limitation in coverage amount is undesirable because the amount of coverage required fully to hedge against FX losses may increase in the event the security appreciates. Also, the insurance coverage provided by the method of the '274 patent is limited to the coverage period specified in the policy after which time the traveler's purchases are not covered. For a traveler wishing FX risk protection, such a limitation is not especially problematic because the traveler can generally specify a coverage period tied to a planned travel schedule. In contrast, investors in financial instruments cannot predict at what time in the future they will exit a particular position so a policy with a fixed coverage period will not be particularly useful.

Accordingly, it is desirable to provide a method and system by which investors that trade in financial instruments in foreign currencies can easily purchase a hedge against the foreign exchange risk associated with a particular trade.

SUMMARY OF THE INVENTION

The present invention is directed to overcoming the drawbacks of the prior art. Under the present invention, a system and method is provided for hedging an investor against a currency risk associated with a purchase of a security having a value, the investor having purchased the security in a foreign currency and the investor desiring to receive the proceeds from a sale of the security in a home currency. The foreign currency and home currency have an exchange rate at the time of the purchase and an exchange rate at the time of the sale. The method includes the steps of receiving a request for hedging against the currency risk for a time period. Next, a cost is calculated for hedging against the currency risk based on the foreign currency, the home currency, the exchange rate at the time of the purchase, the value of the security and the time period. Next, the investor is provided with the proceeds from the sale based on the exchange rate at the time of the sale if the exchange rate at the time of the sale is greater than the exchange rate at the time of the purchase. Finally, the investor is provided with the proceeds from the sale based on the exchange rate at the time of the purchase if the exchange rate at the time of the purchase is greater than or equal to the exchange rate at the time of the sale.

In an exemplary embodiment, if the value of the security appreciates after the purchase, the method includes the step of calculating the cost for hedging against the currency risk based on the appreciated value of the security.

In an exemplary embodiment, if the investor desires to extend the time period for hedging against the currency risk, the method includes the step of calculating the cost for hedging against the currency risk based on the extended time period.

Accordingly, a method and system is provided by which investors that trade in financial instruments in foreign currencies can easily purchase a hedge against the foreign exchange risk associated with a transaction involving a particular security.

The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE DRAWINGS

For a fuller understanding of the invention, reference is made to the following description taken in conjunction with the accompanying drawings, in which.

DETAILED DESCRIPTION OF THE PREFERRED EMBODIMENTS

Figure 1:
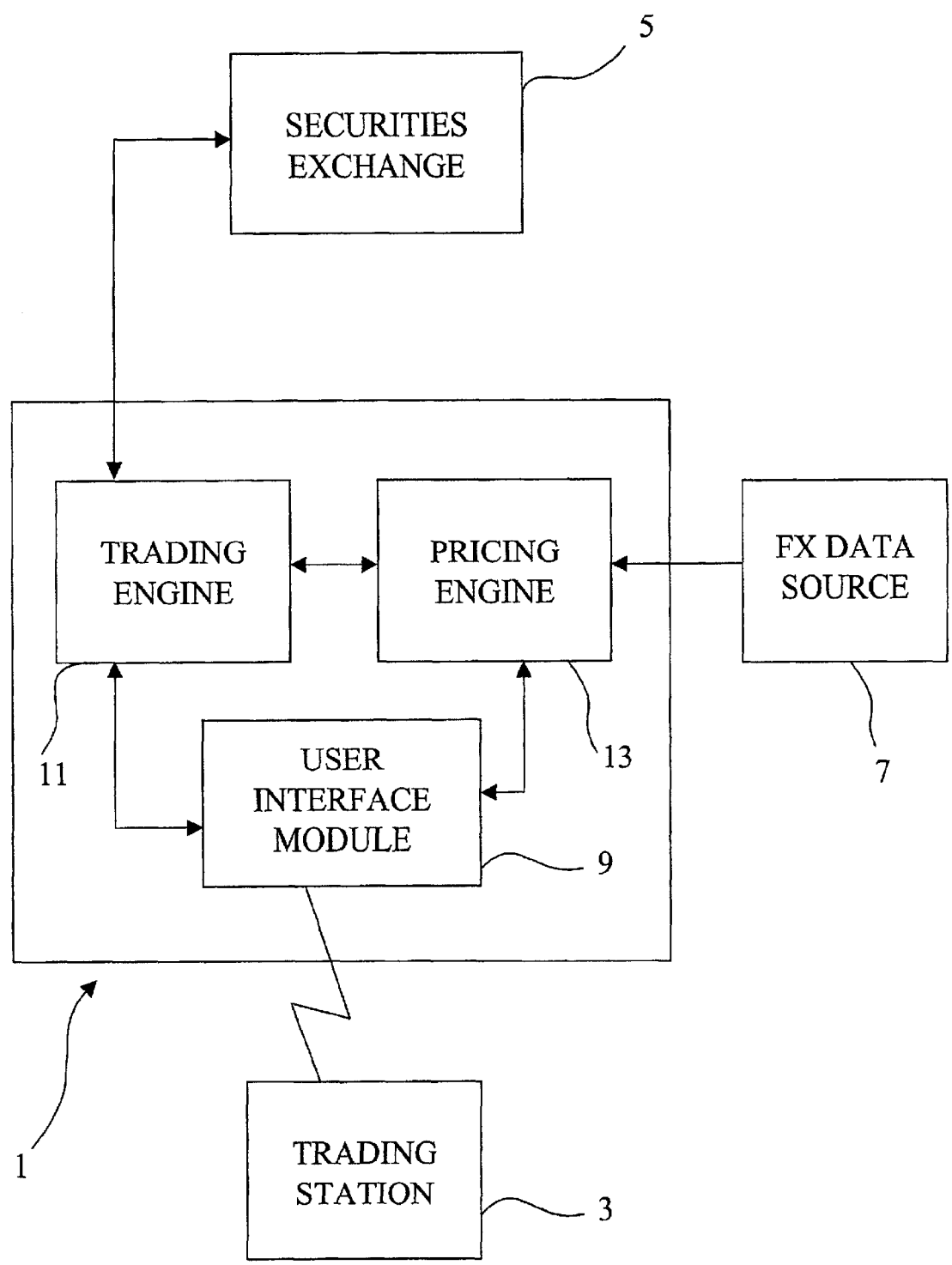
FIG. 1 is a block diagram of the system of the present invention for enabling an investor to purchase a security and hedge against a currency risk associated with such a purchase.

Referring now to FIG. 1, there is shown a block diagram of a system 1 for enabling an investor to purchase a security and hedge against a currency risk associated with such a purchase. In communication with system 1 is a securities exchange 5 through which an investor's transaction in a particular security is executed, such as the New York Stock Exchange, the American Stock Exchange, NASDAQ and the over-the- counter markets. Also in communication with system 1 is a foreign exchange data source 7 for providing system 1 with real-time foreign exchange data. A trading station 3, operated by, for example, an investor or the investor's agent, communicates with system 1 for the purpose of executing transactions in securities and purchasing a hedge for such transactions through system 1. Trading station 3 may be, by way of non-limiting example a personal computer executing a software program designed to interact with system 1 and trading station 3 may communicate with system 1 using any known method including, but not limited to, the Internet or dedicated communications lines.

System 1 includes a user interface module 9 that communicates with trading station 3 for managing the interactions between trading station 3 and system 1 including receiving requests from the investor to transact in a particular security, reporting to the investor confirmations associated with such transaction and coordinating the specification and purchase of a currency risk hedge associated with such transaction.

System 1 also includes a trading engine 11 that manages the transactions in securities requested by the investor. Trading engine 11 sends to securities exchange 5 transaction requests received by user interface module 9 from investor and reports to investor, via user interface module 9, trade confirmations received from securities exchange 5. The construction of trading engine 11 and the interface between trading engine 11 and securities exchange 5 is well known within the skill of the art.

Also included in system 1 is a hedge pricing engine 13. Hedge pricing engine 13 receives from the investor, via user interface module 9, a request for hedging a particular securities transaction, for a specified time period, against a currency risk associated with the fluctuation of the exchange rate between the investor's home currency and the foreign currency in which the securities transaction took place. Upon receipt of the request for a hedge, hedge pricing engine 13 receives from trading engine 11 the details of the particular transaction for which a hedge is sought, including the value of the transaction and whether the transaction was a purchase or a sale. Hedge pricing engine 13 also receives from foreign exchange data source 7 real-time foreign exchange data including the exchange rate between the foreign currency and the home currency that existed at the time the securities transaction was executed. Based on the exchange rate in effect at the time of the securities transaction, the value of the securities transaction and the time period selected by the investor, hedge pricing engine 13 calculates a cost for insuring the securities transaction against foreign exchange risks. Once the cost for foreign exchange risk hedge is calculated, the cost for the hedge is presented to the investor, via user interface module 9, at which point the investor may select to purchase the hedge.

In an exemplary embodiment, the hedging of the exchange rate risk associated with the securities transaction may be executed by using a non-tradable FX put option "American style." Such an "American style" option can be exercised at any time before its maturity date. The FX option is preferably an OTC option, i.e., the option is tailored for a particular securities transaction and according to the specific needs of the investor in regard to e.g. a hedging time period and a value of the securities transaction to be hedged. The OTC FX option is not tradable but linked to a particular position created by the securities transaction for the whole hedging time period. Due to the linking, the OTC FX option is automatically settled when the hedged position is settled during the hedging time period. Linking has the advantage that the investor does not need to understand the detailed mechanism and premium composition of the OTC FX option in order to hedge the exchange rate risk associated with the securities transaction.

In another exemplary embodiment, the hedging transaction may be executed using tradable currency certificates of the bear type having standardized strike levels and standardized maturity dates but being broken down into e.g. one currency unit like one dollar. If an investor intends to hedge e.g. the exchange rate risk associated with a securities transaction having a transaction value of 14.320 dollars, the hedging transaction thus has a volume of 14.320 currency certificates, each currency certificate allows the sale of one dollar at the maturity date with a specific exchange rate, i.e., the strike level. As mentioned above, currency certificates have standardized strike levels. The currency certificate for purchase depends on the current exchange rate. Generally, currency certificates having a strike level close to the current exchange rate are automatically chosen by the system. The cost of a currency certificate having a particular maturity date and a particular strike level depends on the current exchange rate. Since currency certificates are generally tradable, linking between the position of the securities transaction and the position of the hedging transaction of currency certificates is not required. In other words, the currency certificates may be sold by the investor independently from the exchange traded item of the primary transaction.

Determining the price for hedging the exchange rate risk associated with a specific securities transaction depends on the type of hedging transaction used. If the hedging transaction involves OTC FX options, the cost of hedging a securities transaction, i.e., the price of the OTC FX option, depends on the hedging time period, the value of the securities transaction to be hedged and the ex change rate when the securities transaction is executed. Upon execution of a securities transaction, pricing engine 13 calculates the hedging price based on these parameters.

On the other hand, if the hedging transaction uses currency certificates broken down to a small currency unit, the cost of hedging the securities transaction depends on the value of the securities transaction as well as on the specific currency certificate chosen. Upon execution of the securities transaction, pricing engine 13 determines the hedging price by selecting a suitable currency certificate based on the current exchange rate and by multiplying the price of a single selected currency certificate with a number of currency certificates required to hedge the transaction value or a user-selected fraction thereof. Because currency certificates have standardized strike levels, the specific currency certificate is selected by pricing engine 13 for determining the hedging price, such that the difference between the available strike levels and a current exchange rate received from FX data source 7 is minimized. Because currency certificate have standardized maturity dates, the hedging time period may not be freely selected by the investor. Instead, pricing engine 13 sends the investor, via use interface module 9, a hedging offer comprising several hedging prices relating to different maturity dates. The investor may then select a specific maturity date, i.e., hedging period, and the corresponding selection request of the investor is used for executing a hedging transaction.

Figure 2:
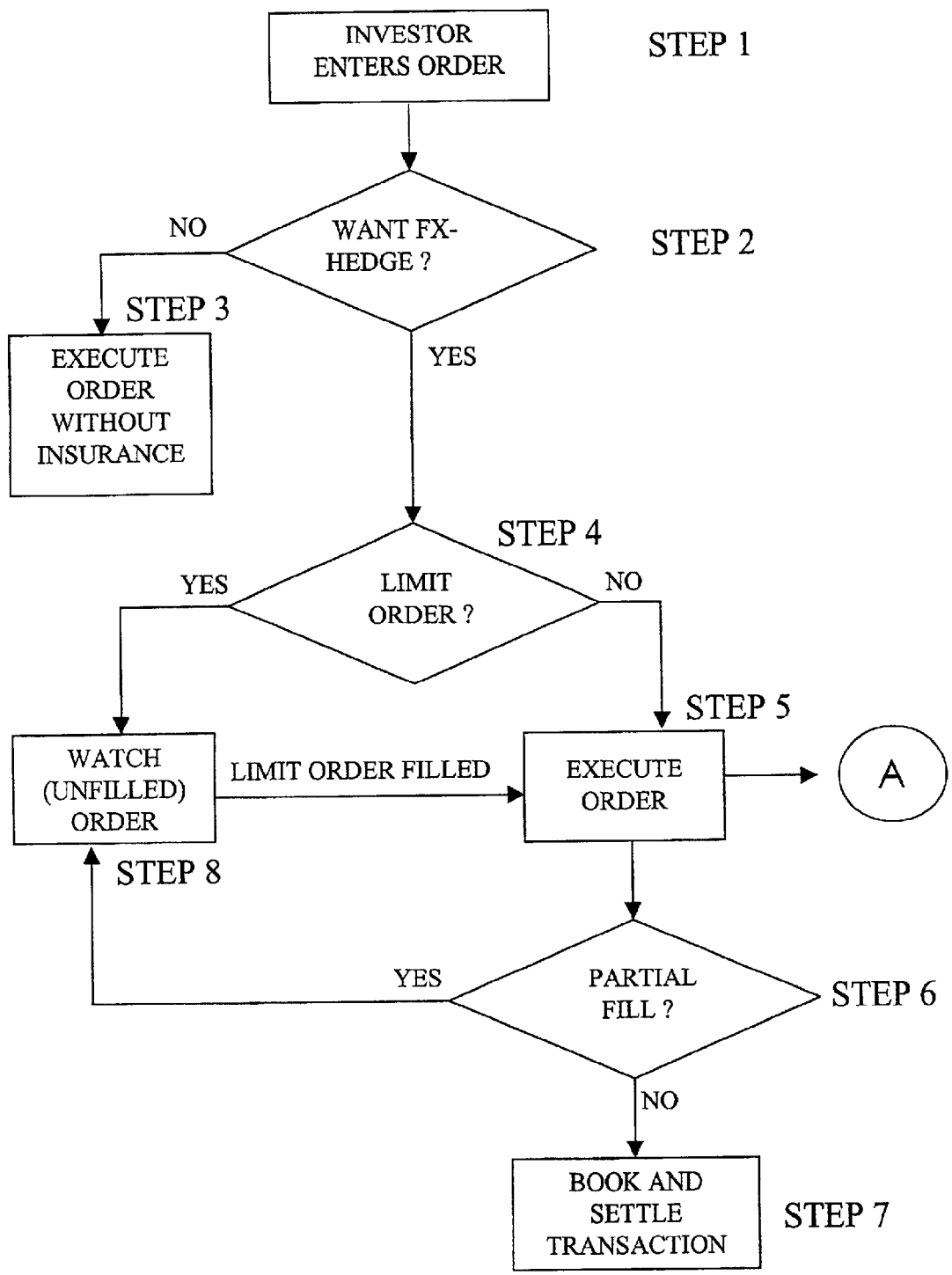
FIG. 2 is a flow chart of the method of the present invention for receiving securities transaction and hedge requests from the investor.

Referring now to FIG. 2, there is shown a flow chart of the method for receiving securities transaction and hedge requests from the investor according to the present invention. Initially, in Step 1, the investor submits a request to system 1 to purchase a security, for example 200 shares of XYZ Corp. stock. Next, in Step 2, system 1 asks the investor whether the investor would like to buy a hedge to protect against currency fluctuations associated with the purchase of XYZ. Corp. shares. If the investor declines to purchase a hedge, the investor's request to purchase XYZ Corp. stock is processed, as in Step 3, according to procedures that are well known in the art. If the investor indicates that a hedge is desired, in Step 4 system 1 determines whether the order to purchase XYZ Corp. stock was a limit order. If the order was not a limit order, then in Step 5, the order to purchase 200 shares of XYZ Corp. stock is executed. System 1 then determines, in Step 6, if the 200 share order was completed. If it was, then the transaction is booked and settled, in Step 7.

If the order was a limit order, or if the order was partially filled, then in Step 8, system 1 watches the unfilled orders to determine when the pricing and availability of XYZ Corp. stock on securities exchange 5 is such that the unfilled order may be filled. When that occurs, the method proceeds to Step 5 where the unfilled orders are executed.

Figure 3:
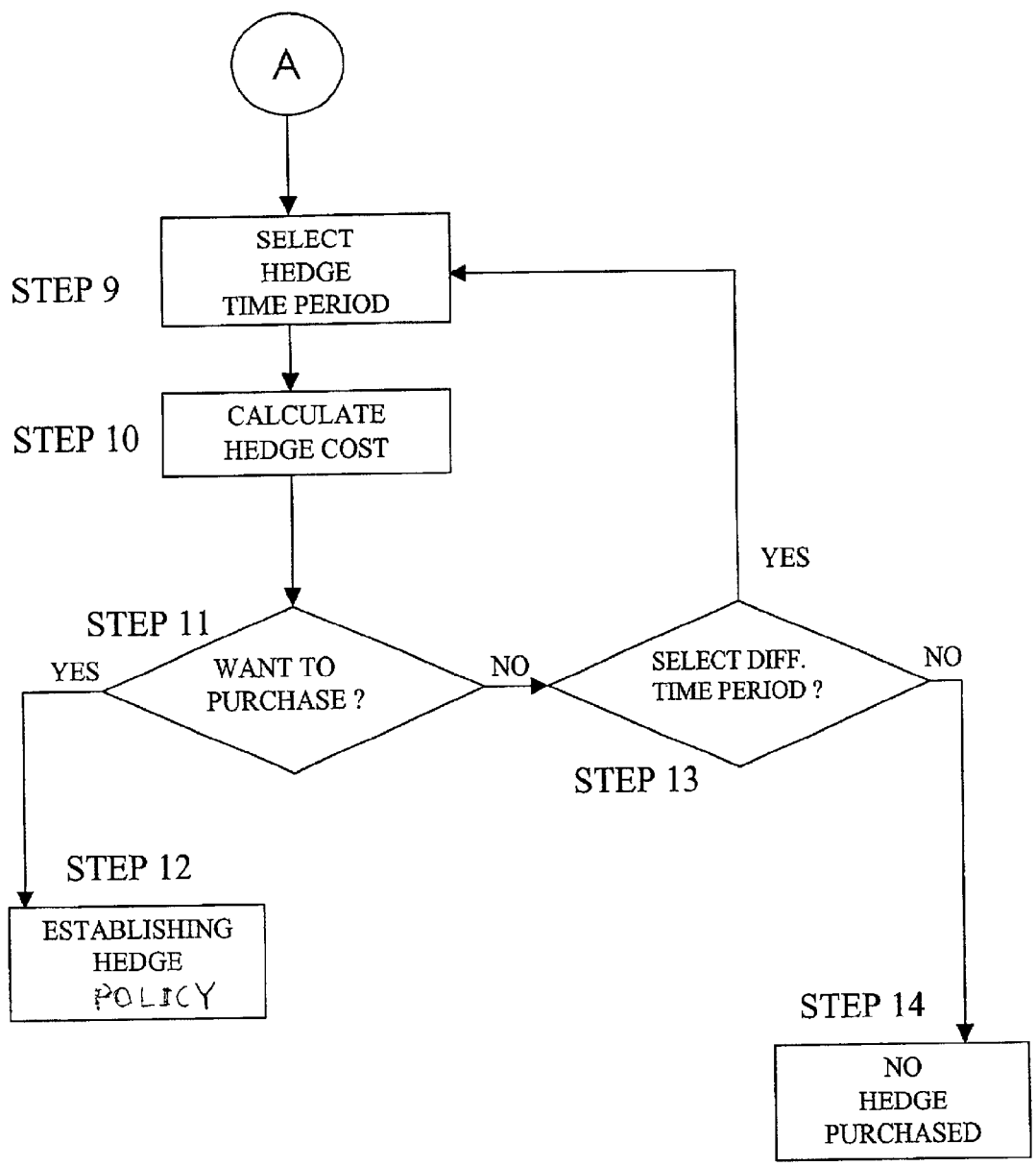
FIG. 3 is a flow chart of the method of the present invention for calculating the cost for hedging against foreign exchange currency risk associated with an executed securities transaction.

Referring now to FIG. 3, there is shown a flow chart of the method for calculating the cost for hedging against foreign exchange currency risk associated with an executed securities transaction. With each order execution in shares of XYZ Corp. in Step 5, the method proceeds to calculate a cost for hedging against the FX risk associated with those shares. In Step 9, system 1 requests from investor a time period for which the investor desires the hedge. For example, if the investor expects to hold the position in XYZ Corp. stock for one year, then the investor may request that the hedge provide coverage going out one year. Once the investor selects the hedge time period, in Step 10, the system calculates the cost for the hedge based on the value of XYZ Corp. shares, the exchange rate between the investor's home currency and the foreign currency in which the investor purchased the XYZ Corp. shares and the hedge time period. Because the investor's single request to purchase 200 shares of XYZ Corp. may be executed, for example, in two 100 shares parts because of market conditions or because the investor placed a limit order, the cost for the hedge must be calculated for each 100 share part separately based on the foreign exchange rate at the time each part of the order was executed and the value of each part of the order. Once the cost for the hedge is calculated, in Step 11 system 1 asks whether the investor desires to purchase the hedge. If the investors chooses to purchase the hedge, then in Step 12 the hedge for the purchase of 200 shares of XYZ Corp. is put into effect. If the investor determines that a different hedge time period is more desirable, then the investor is given the opportunity, in Step 13, to have the cost for the hedge recalculated using the more desirable time period. If, however, the investor decides against purchasing the hedge, then the method proceeds to Step 14 in which case the transaction in XYZ Corp. stock remains unhedged against FX risks.

In order to purchase a hedge for the FX risk associated with a particular securities transaction, the investor must specify the time period for which the investor desires to have the hedge. Because the securities markets are unpredictable, however, it is often the case that the investor may choose to not sell a security within the hedge time period the investor previously specified. To accommodate a change in the hedge time period, system 1 may notify the investor, using any method known in the art including, but not limited to, electronic mail, facsimile or telephone, that the originally selected time period is about to expire and query the investor as to whether a hedge for an extended time period is desired. Alternatively, the investor may request from system 1 a hedge policy coveting the new time period. If the investor chooses to hedge the time period of the insurance coverage, system 1 calculates the cost of the hedge based on the new time period, in the same manner as described above, and the investor can then purchase the FX risk hedge covering the new time period.

In addition to a change in the coverage time period, it may often occur that the security purchased by the investor appreciates in value after the original purchase was made. If that occurs, then the original hedge policy will not be sufficient to cover the FX risk associated with selling the appreciated security. In order to provide investor with full FX risk hedge coverage for the particular security, system 1 may notify the investor that the security has appreciated in value and allow the investor to purchase a hedge covering the FX risk associated with the increased value of the security. Alternatively, the investor may request from system 1 a hedge policy covering the increased value of the security. If the investor chooses to hedge against risks associated with the increased value of the security, system 1 calculates the cost of a hedge associated with the increased value of the security and the investor can then purchase the FX risk hedge covering the increased value.

When the investor sells the security for which an FX risk hedge was purchased, the investor will receive the proceeds from the sale in the investors home currency based on the better of the exchange rate at the time of the purchase or the exchange rate at the time of the sale. For example, if the exchange rate at the time of the purchase of the securities was 100 yen to one dollar, and the exchange rate at the time of the sale was 110 yen to one dollar, then the investor (who is receiving the sale proceeds in yen) will receive the sale proceeds based on 110 yen to the dollar, as this is the higher exchange rate. In this case, because the exchange rate at the time of the sale was more favorable to the investor than the exchange rate at the time of the purchase, the investor does not utilize the benefits of the hedge coverage. If, on the other hand, the exchange rate at the time of the sale is 95 yen to the dollar, then the investor will receive the sale proceeds based on 100 yen to the dollar, the exchange rate in effect at the time of the purchase of the securities. In this case, the investor uses the benefit of the hedge coverage.

Although the present invention was described above with respect to providing an FX risk hedge for an investor that purchases a security with the intent of selling the security at a future date, it will be obvious to one of ordinary skill in the art that the present invention may be applied to a case where the investor sells a security short with the intent of purchasing the security at a future time.

Accordingly, the present invention provides a method and system by which an investor can easily purchase a hedge against the foreign exchange risk associated with a transaction involving a the purchase of a security in a foreign currency. In addition, according to the present invention, the investor can have the hedge coverage adjusted to cover FX risks associated with an extended time period as well the appreciation of the security.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A method for hedging an investor against a currency risk associated with a purchase of a security having a value, said investor purchasing said security in a foreign currency and said investor desiring to receive proceeds from a sale of at least a portion of said security in a home currency, said foreign currency and said home currency having an exchange rate at the time of said purchase and an exchange rate at the time of said sale, said method comprising the steps of:

receiving a request for hedging against said currency risk for a time period;

calculating a cost for hedging against said currency risk based on said foreign currency, said home currency, said exchange rate at the time of said purchase, said value and said time period;

providing the investor with said proceeds from said sale based on said exchange rate at the time of said sale if said exchange rate at the time of said sale is greater than the exchange rate at the time of said purchase; and providing the investor with said proceeds from said sale based on said exchange rate at the time of said purchase if said exchange rate at the time of said purchase is greater than or equal to the exchange rate at the time of said sale, wherein at least one of said steps is performed by a computer.

2. The method of claim 1, wherein said value of said security appreciates after said purchase, and the step of calculating a cost includes the step of:

calculating said cost for hedging against said currency risk based on said appreciated value of said security.

3. The method of claim 1, wherein said investor desires to extend the time period for hedging against said currency risk, and the step of calculating a cost includes the step of:

calculating said cost for hedging against said currency risk based on said extended time period.

4. The method of claim 1, wherein said purchase is a limit order purchase comprising a plurality of individual purchases each having a value and wherein said calculating step includes the step of:

calculating a cost for hedging against said currency risk for each of said plurality of individual purchases based on said foreign currency, said home currency, said exchange rate at the time of said each of said plurality of individual purchases, said value of said each of said plurality of individual purchases and said time period.

5. The method of claim 1, further comprising the step of:

hedging against the currency risk using an American-style non-tradable foreign exchange option.

6. The method of claim 1, further comprising the step of:

hedging against the currency risk using currency certificates of the bear type having standard strike levels and maturity dates and being broken down into currency units.

7. A system for hedging an investor against a currency risk associated with a purchase of a security having a value, said investor purchasing said security in a foreign currency and said investor desiring to receive proceeds from a sale of at least a portion of said security in a home currency, said foreign currency and said home currency having an exchange rate at the time of said purchase and an exchange rate at the time of said sale, said investor desiring to insure against said currency risk for a time period, the system comprising:

- a foreign exchange rate data source; and
- a pricing engine, said pricing engine receiving said exchange rate at the time of said purchase and the exchange rate at the time of said sale from said foreign exchange rate data source, said pricing engine calculating a cost for hedging against said currency risk based on said foreign currency, said home currency, said exchange rate at the time of said purchase, said value and said time period;
- wherein the investor is provided with said proceeds from said sale based on said exchange rate at the time of said sale if said exchange rate at the time of said sale is greater than the exchange rate at the time of said purchase and the investor is provided with said proceeds from said sale based on said exchange rate at the time of said purchase if said exchange rate at the time of said purchase is greater than or equal to the exchange rate at the time of said sale.

8. The system of claim 7, wherein said value of said security appreciates after said purchase, and wherein said pricing engine calculates said cost for hedging against said currency risk based on said appreciated value of said security.

9. The system of claim 7, wherein said investor desires to extend the time period for hedging against said currency risk, and wherein said pricing engine calculates said cost for hedging against said currency risk based on said extended time period.

10. The system of claim 7, wherein said purchase is a limit order purchase comprising a plurality of individual purchases each having a value and wherein said pricing engine calculates a cost for hedging against said currency risk for each of said plurality of individual purchases based on said foreign currency, said home currency, said exchange rate at the time of said each of said plurality of individual purchases, said value of said each of said plurality of individual purchases and said time period.

11. The system of claim 7, further comprising a trading engine, said trading engine causing said security to be purchased by the investor through a securities exchange, wherein said pricing engine receives said value of said security from said trading engine.

12. The system of claim 11, further comprising a trading station, said pricing engine receiving from said trading station said time period for hedging against said currency risk.

13. The system of claim 12, wherein said trading engine receives from said trading station a request to purchase said security and a request to sell said security.

\* \* \* \* \*